2 Sheets—Sheet 1.

T. D. DAVIS.
COOKING-APPARATUS.

No. 175,945. Patented April 11, 1876.

Witnesses:
Geo. A. Thompson.

Thomas D. Davis
by his atty
Inventor.

N. PETERS, PHOTO-LITHOGRAPHER, WASHINGTON, D. C.

2 Sheets—Sheet 2.

T. D. DAVIS.
COOKING-APPARATUS.

No. 175,945. Patented April 11, 1876.

Witnesses
Geo. A. Thompson.
Lehr J. Srekirk

Thomas D. Davis
his atty Alex Selkirk
Inventor.

N. PETERS, PHOTO-LITHOGRAPHER, WASHINGTON, D.C.

UNITED STATES PATENT OFFICE.

THOMAS D. DAVIS, OF WATERFORD, NEW YORK.

IMPROVEMENT IN COOKING APPARATUS.

Specification forming part of Letters Patent No. 175,945, dated April 11, 1876; application filed January 17, 1876.

*To all whom it may concern:*

Be it known that I, THOMAS D. DAVIS, of the town of Waterford, county of Saratoga, and State of New York, have invented certain Improvements in Cooking Apparatus; and I do hereby declare that the following is a description thereof, reference being had to the accompanying drawings, in two sheets, forming a part of this specification, in which—

Figure 1:
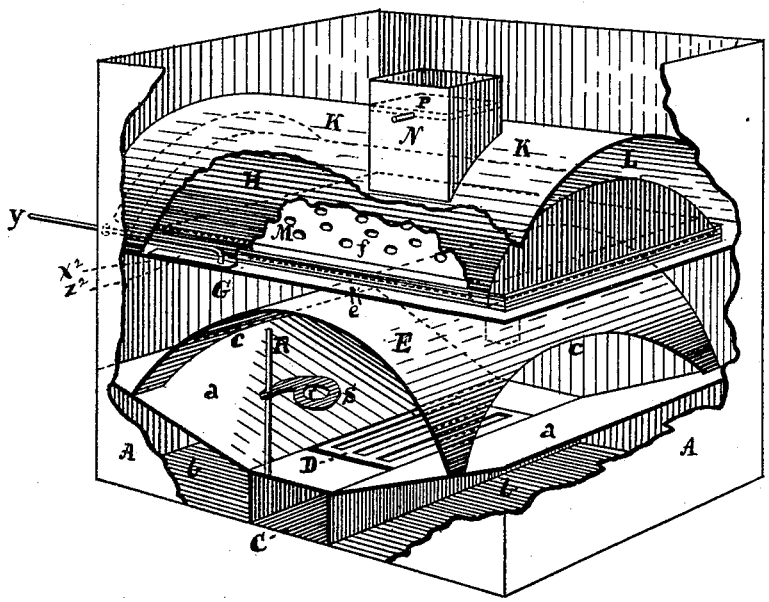
Figure 2:
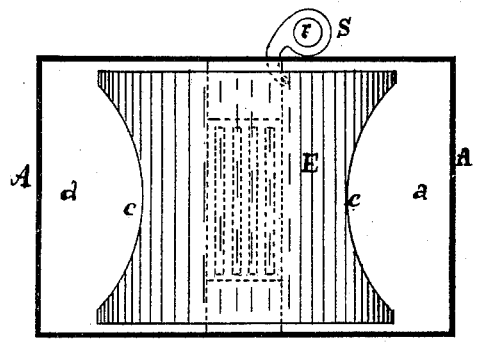
Figure 3:
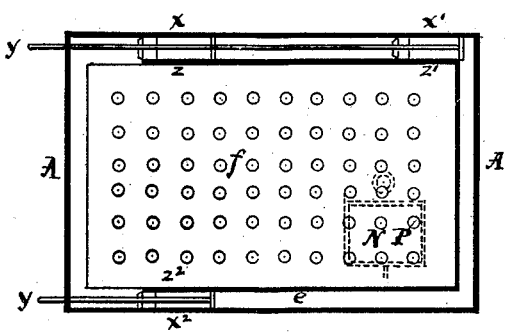
Figure 4:
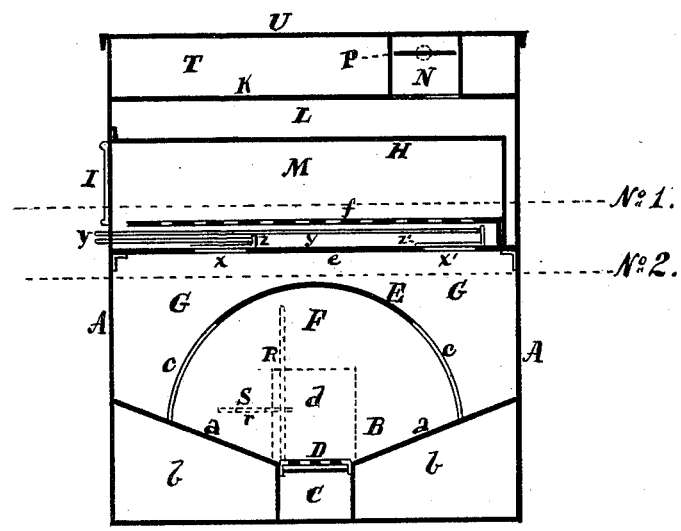
Figure 5:
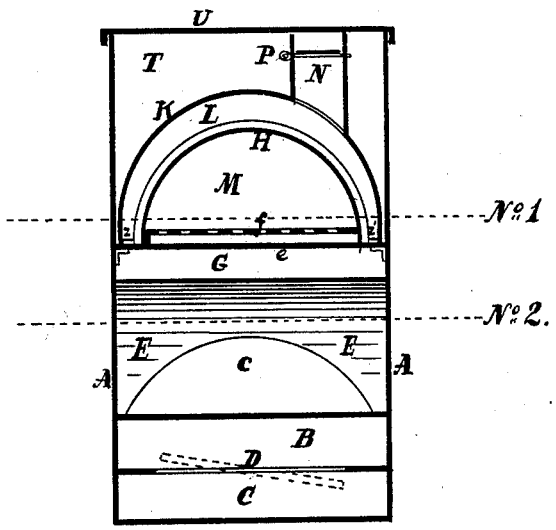

Figure 1 represents a perspective view of the apparatus with parts of the outer shell broken away, and illustrating the improvements. Fig. 2 is a horizontal view taken at line No. 1 in Figs. 4 and 5. Fig. 3 is a horizontal view taken at line No. 2 in Figs. 4 and 5. Fig. 4 is a sectional elevation. Fig. 5 is a sectional elevation.

My invention relates to an apparatus for cooking by both baking and boiling processes; and consists in the several parts and arrangements of the combination of parts employed, whereby the heat evolved from the fuel may, in its major portion, be utilized for cooking purposes, and be directed to completely envelop the oven in a uniform manner, with all the parts heated to about an equal temperature, while, at the same time, the general temperature of the oven may be materially increased or decreased, as the nature of the articles to be cooked or baked may demand, and also be made to operate with vessels for boiling, in which the whole body of the vessel may be evenly heated, and the vapor and odors be carried off in the draft, while an operator may readily place said boiling vessels or withdraw them without being in the least endangered.

To enable others skilled in the art to make and use my invention, I will proceed to describe it in reference to the drawings and the letters of reference marked thereon, the same letters indicating like parts.

In the drawings, A A represent the outer shell of the apparatus. B is the fire-chamber, constructed for the use of either wood or coal as fuel, for operating with the apparatus. C is the ash-pit. D is the grate.

Extending outward from the grate toward the sides of the outer wall of the apparatus are the inclined plates $a\ a$, made of cast or sheet metal, and so set that their edges, toward the outer edges, will be higher than their edges toward the grate, as shown in Figs. 1 and 4, so as to produce the said incline of the said plates. The chambers $b\ b$ between the said plates and the bottom plate may be employed as warming closets or chambers, for warming any plates or dishes, as may be desired, and may be provided with suitable doors, for access to the interior of the same.

E is an arching deflecting-plate, made of cast-iron, with side openings $c\ c$, for the passage of the hot gases from the combustion-chamber F to the chamber G above, so that the hot gases generated and reverberating in the combustion-chamber F will, after highly heating the deflecting-plate immediately over the fire, and through the said deflecting-plate also heat the chamber G above, discharge the hot gases into the said chamber at their ends, and thereby secure a uniform heating of the chamber G. Placed above the chamber G is the bottom plate $e$ of the oven. Supported from the said bottom plate is the perforated supplemental oven-plate $f$, supported at a short distance above the plate $e$, as shown. Over the supplemental plate $f$, and inclosing the same, is the arched plate H, which forms the side and top walls of the oven, to which access may be had through the door I. The said plate, forming the walls of the oven, is inclosed by the arched plate K, between which and the plate H is a chamber, L, in which the hot gases may circulate to heat the oven-chamber M through the plate H, forming the sides and top of the oven.

Made in the plate $e$, and communicating from the chamber G to the hot-gas-circulating chamber L at several points, as at $x$, $x^1$, and $x^2$, are openings, with which are fitted dampers $z$, $z^1$, and $z^2$, provided with proper handles $y$, passing through the outer wall of the apparatus, by which said dampers may be operated. These openings and their dampers are, preferably, placed as shown in Fig. 3, two at one side, as $x\ z$ and $x^1\ z^1$, each toward an end of the plate $e$, and one, $x^2\ z^2$, at the opposite side toward the front of the oven.

Made with, or set on, the arching plate K is the exit-flue N, communicating from the chamber L to the pipe leading to the chimney. The said flue is provided with a damper, P, by which the combustion of the fuel within may be checked or regulated.

Properly supported at the door $d$ of the fire-chamber B is the crane R, carrying a pot-supporting plate, S, which plate is provided with a pot-hole, $r$. The said plate is capable of being swung to the outside of the door of the apparatus or within the fire-chamber, as may be desired. The space T, between the arching plate K and the top plate U of the apparatus, may be filled, in whole or part, by any non-conducting material; or the said arching plate may be covered with plaster-of-paris, or any non-conducting material that may be capable of preventing an excessive radiation of heat from the plate K, inclosing the hot-gas-circulating chamber L.

The manner in which the several parts of this invention operate is as follows, to wit: When the fire of either wood or coal is kindled in the fire-chamber B, over the grate D, the draft of the apparatus will cause the hot gases, after reverberating in the arched combustion-chamber F, to pass out at the sides through the openings $c\ c$; thence up through the openings $x\ x^1\ x^2$ into the hot-gas-circulating chamber L, when the dampers $z, z^1$, and $z^2$ are moved open, and thence escape through the exit N to the chimney.

In the process of combustion the heat of the fire will act against the plate E, forming the arch of the fire-chamber, and highly heat the same, which plate will prevent an excessive heating of the plate $e$ above. The hot products of combustion will be drawn from the said arched combustion-chamber, through the side openings $c\ c$, into the chamber G above, and highly heat the plate $e$ above, and into the chamber L through the openings $x, x^1$, and $x^2$, to envelop the plate H, forming the side and top walls proper of the oven M, when the entire oven will be enveloped with hot gases at about a uniform temperature at every side.

The perforated plate $f$, standing on the plate $e$, forming the bottom of the oven, operates to permit the heat from the hot gases to be evenly diffused through the space between plates $e$ and $f$, so that there will not be, in the plate supporting the articles to be baked, any portions excessively heated, so as to burn the articles within.

By moving the dampers $z\ z^1\ z^2$ to a greater or less distance, to uncover more or less of the openings $x, x^1$, and $x^2$, and also operating the damper P in the exit-flue N, to regulate the draft, the oven may be heated to any desired temperature required for baking or roasting any articles for food.

The inclined plates $a$ are intended to operate as deflecting-radiators, to throw the heat radiating from the sides of the fire upward against the arched plate above, and thereby utilize, to a degree, the heat which would otherwise be lost for cooking purposes.

By means of the pot-supporting plate $s$, carried by the crane R, a cooking-vessel may be introduced within the combustion-chamber F, over the fire, to be there operated with by the heat within the said chamber, to boil and cook any article, as may be desired, in a far less period of time than can be had where the vessel, in its main portion, is exposed to the general temperature of the room, while the vapors and odors arising from boiling or cooking will be carried off in the draft. This crane enables the operator to transfer the vessel supported from the supporting-plate from the inside of the combustion-chamber to the outside of the apparatus, or vice versa, as may be required, in an easy manner, and without the least danger to the operator.

Having described my invention, what I claim, and desire to secure by Letters Patent, is—

1. The combination, with the fire-chamber, of the arched plate E, provided with side openings $c\ c$, communicating from the combustion-chamber F below the said arched plate to the chamber G above said plate, substantially as set forth.

2. The plate $e$, in combination with the arched plate E, side openings $c\ c$, and fire-chamber B, substantially as set forth.

3. The oven M, chamber G, arched plate E, provided with side openings $c\ c$, and the fire-chamber B, combined substantially as set forth.

4. The combination, with the oven M, having a bottom, $e$, over a chamber, G, and arched plate E, having side openings $c\ c$, leading to said chamber from the combustion-chamber, of the perforated bottom $f$, with an intermediate space between it and plate $e$, substantially as set forth.

5. The combination, with the oven M, having a chamber, G, below, of the hot-gas-circulating chamber L, openings $x\ x^1\ x^2$, and exit-flue N, substantially as set forth.

6. The combination, with the hot-gas-circulating chamber L, chambers G and F, the openings $x\ x^1\ x^2$, and exit-flue N, of the dampers $z, z^1, z^2$, and P, substantially as set forth.

THOMAS D. DAVIS.

Witnesses:
GEO. P. PRESCOTT,
ALEX. SELKIRK.